United States Patent [19]

Choby et al.

[11] 4,387,923
[45] Jun. 14, 1983

[54] VEHICLE WINDOW ASSEMBLY

[75] Inventors: David Choby; James Crawford; James Mariel, all of Elkhart, Ind.

[73] Assignee: Excel Industries, Inc., Elkhart, Ind.

[21] Appl. No.: 315,248

[22] Filed: Oct. 26, 1981

[51] Int. Cl.³ .......................................... B60D 27/04
[52] U.S. Cl. .................................. 296/201; 52/208; 52/718; 296/84 R; 296/93
[58] Field of Search .............. 296/93, 84 R, 84 A, 296/84 D, 90, 201; 52/718, 208, 400

[56] References Cited

U.S. PATENT DOCUMENTS

| | | | |
|---|---|---|---|
| 2,569,955 | 10/1951 | Schassberger | 296/84 R |
| 2,647,289 | 8/1953 | Harbert | 52/208 |
| 2,736,404 | 2/1956 | Clingman | 296/93 |
| 2,794,218 | 6/1957 | Ramsay | 296/93 |
| 2,814,525 | 11/1957 | Thomas | 296/93 |
| 3,045,787 | 7/1962 | Attwood | 296/93 |
| 3,843,982 | 10/1974 | Lane et al. | 114/361 |
| 4,139,234 | 2/1979 | Morgan | 296/84 A |

FOREIGN PATENT DOCUMENTS

| | | | |
|---|---|---|---|
| 2820620 | 11/1979 | Fed. Rep. of Germany | 296/93 |
| 1133133 | 3/1957 | France | 296/93 |

Primary Examiner—Robert R. Song
Assistant Examiner—D. Pedder
Attorney, Agent, or Firm—James D. Hall

[57] ABSTRACT

A window assembly used in vehicles including a resilient frame about the peripheral edge of a glazing panel and formed to permit securement of the panel within a window opening without the use of separate attachment devices.

1 Claim, 7 Drawing Figures

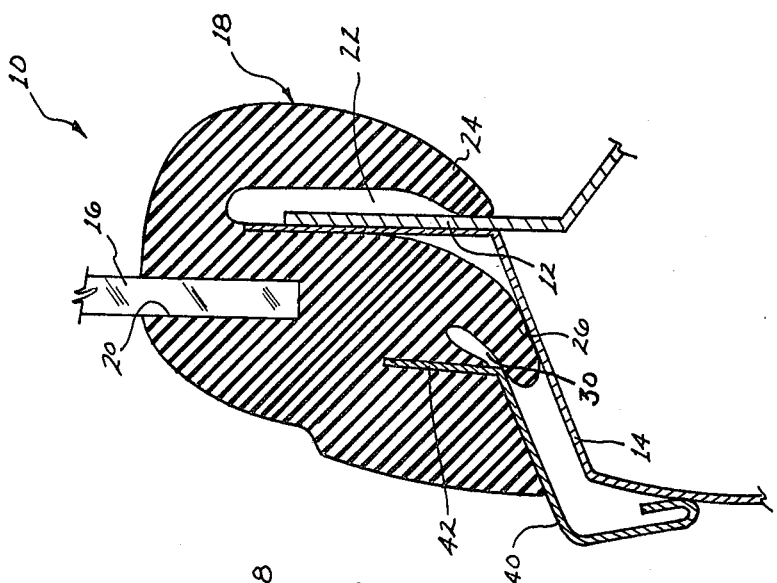
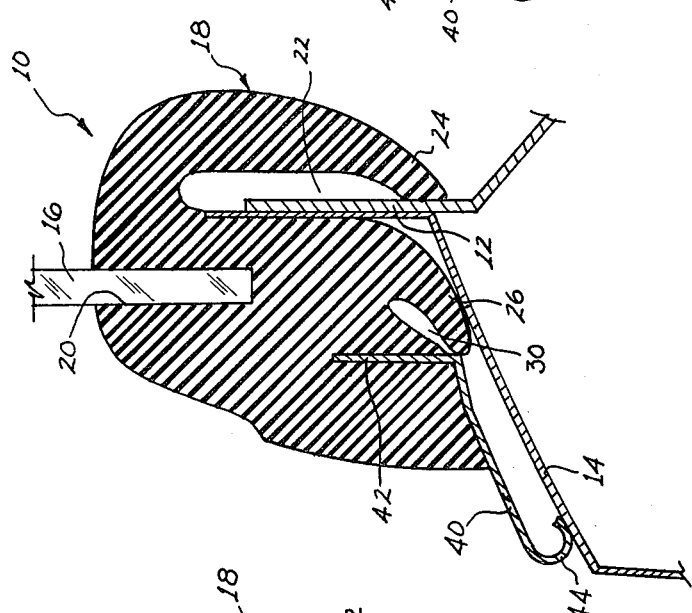
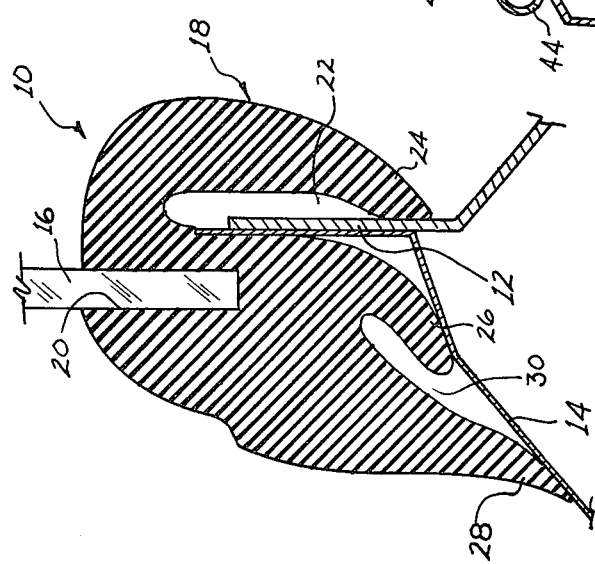

VEHICLE WINDOW ASSEMBLY

SUMMARY OF THE INVENTION

This invention relates to a window assembly and will have specific application to the securement of a glazing panel within a window opening of a vehicle.

The window assembly includes a frame made of a resilient material and having a recess in one side for accepting the peripheral edge of a glazing panel. The frame has a pair of fingers extending from its side opposite the glazing panel recess which are separated by a channel. The window opening in the vehicle is defined by a flange which fits into the channel between the two fingers with one finger resting against the interior of the flange and the second finger pressed into liquid sealing contact with the exterior of the vehicle body. The frame also includes a third finger which is separated from the second finger and which also presses against the vehicle body. The window assembly may be secured in a vehicle body opening in a liquid tight manner without the use of separate attachment devices.

Accordingly, it is an object of this invention to provide a vehicle window assembly having a resilient frame permitting single and rapid installation of the assembly without the use of separate fastening devices.

Another object of this invention is to provide a vehicle window assembly having a resilient frame fitting about the periphery of the glazing panel and having a plurality of fingers pressed against the vehicle body in liquid sealing contact.

Other objects of the invention will become apparent upon a reading of the following description.

BRIEF DESCRIPTION OF THE DRAWINGS

FIG. 5 is a section like FIG. 2 but showing the window assembly attached to a vehicle.
FIG. 6 is a section like FIG. 3 but showing the window assembly attached to a vehicle.
FIG. 7 is a section like FIG. 4 but showing the window assembly attached to a vehicle.

DESCRIPTION OF THE PREFERRED EMBODIMENT

Figure 1:
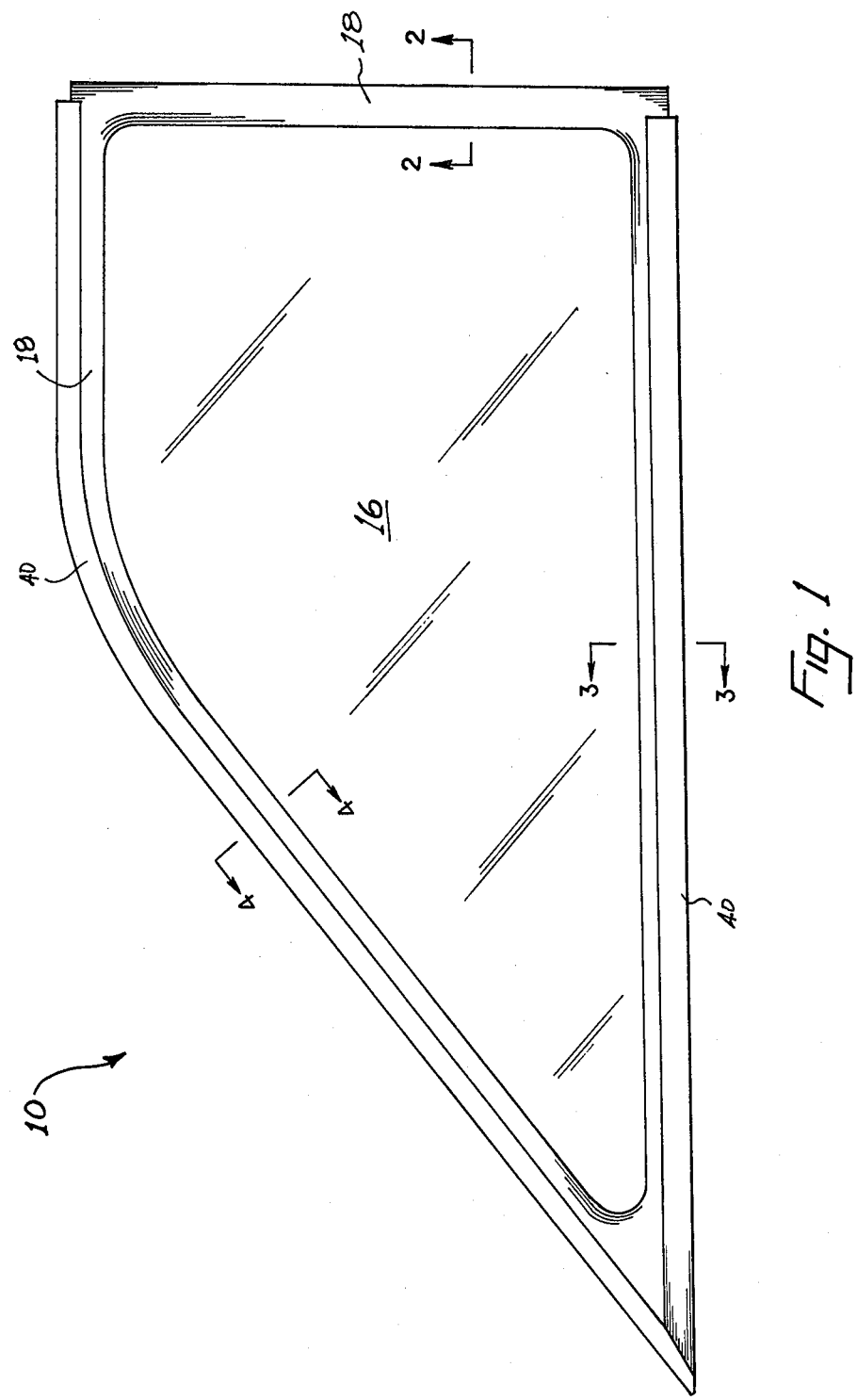
FIG. 1 is a side view of the window assembly.
Figure 4:
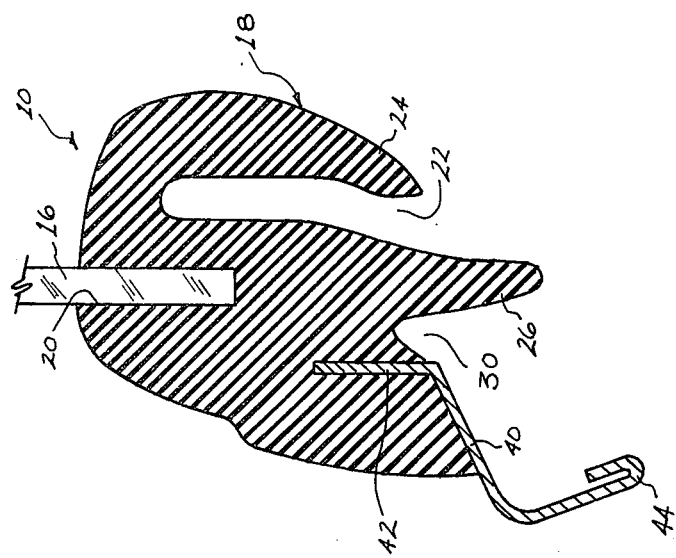
FIG. 4 is a section taken along line 4—4 of FIG. 1.
Figure 3:
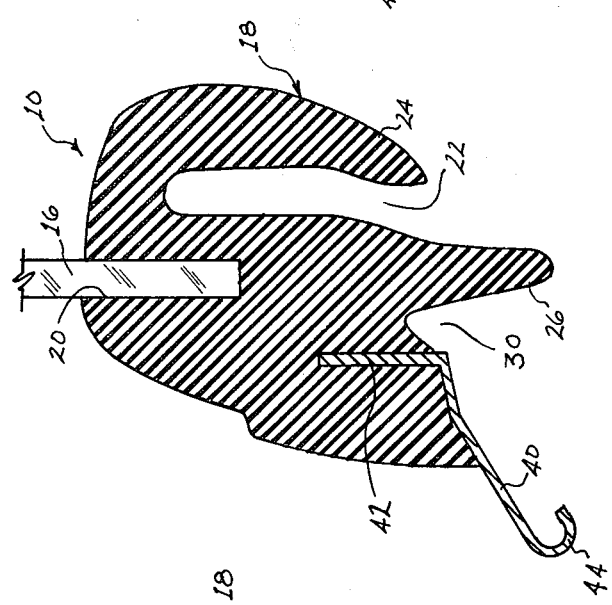
FIG. 3 is a section taken along line 3—3 of FIG. 1.
Figure 2:
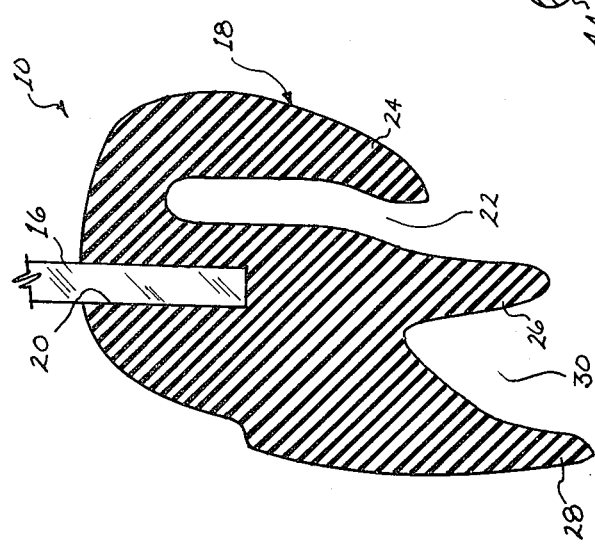
FIG. 2 is a section taken along line 2—2 of FIG. 1.

The preferred embodiment illustrated is not intended to be exhaustive or to limit the invention to the precise form disclosed. It is chosen and described in order to explain the principles of the invention and its application and practical use to thereby enable others skilled in the art to utilize the invention.

The window assembly 10 is intended for use as part of a vehicle having an opening formed in its body to accept the assembly. The vehicle opening is defined by a peripheral flange 12 which extends about the opening and which is a part of the body 14 of the vehicle. Window assembly 10 includes a glazing panel 16 which is enclosed about its peripheral edge, or a portion thereof, by a resilient frame 18. Frame 18 may be formed of a molded polyurethane. The peripheral edge of glazing panel 16 fits within a recess 20 formed in one side of frame 18. A channel 22 is formed in the side of frame 18 opposite recess 20 between two fingers 24 and 26.

Flange 12 fits within channel 22 when the window assembly is fitted into the vehicle's window opening. Finger 24 presses against the inside of flange 12 and finger 26 presses against the outside of the flange with its end portion flexed and compressed against vehicle body 14 to form a liquid seal. Frame 12 includes a third finger 28 which is spaced from finger 26 by a second channel 30. Finger 28 contacts vehicle body 14 at a location spaced from finger 26 when window assembly 10 is placed in the vehicle's window opening to form a double seal as shown in FIG. 5.

In FIGS. 6 and 7, frame finger 28 includes a trim piece 40. Each trim piece 40 is embedded at one end 42 in frame 18 and rests against vehicle body 14 at its other end 44.

It is to be understood that the invention is not to be limited to the above description, but may be modified within the scope of the appended claims.

We claim:

1. A window assembly used in a vehicle window opening defined by a peripheral flange forming a part of the vehicle body, said window assembly comprising a glazing panel and a resilient enclosing frame, said frame having a recess in one side, said glazing panel at its peripheral edge fitting into said frame recess, said frame including three fingers, each finger separated by a channel at the opposite side of the frame from said recess therein, a first and second of said fingers being flexible and separated by first said channel, said second and a third of said fingers being separated by a second said channel, said window opening flange fitting into said first channel of the frame with said second finger thereof being flexed into liquid sealing contact with said vehicle body, said third finger including a decorative trim piece embedded in said frame at one end and extending downwardly and below said third finger and bearing against said vehicle body at its other end, said trim piece contacting said body at a location spaced from the place of contact of said body and second finger.

* * * * *

UNITED STATES PATENT AND TRADEMARK OFFICE
CERTIFICATE OF CORRECTION

PATENT NO. : 4,387,923

DATED : June 14, 1983

INVENTOR(S) : David Choby, et al.

It is certified that error appears in the above-identified patent and that said Letters Patent is hereby corrected as shown below:

On the title page Item (75) add as a co-inventor

-- Steve Spretnjak ---.

Signed and Sealed this

Sixteenth Day of August 1983

[SEAL]

Attest:

GERALD J. MOSSINGHOFF

Attesting Officer

Commissioner of Patents and Trademarks